(12) United States Patent
Momochi (10) Patent No.: US 12,334,774 B2
(45) Date of Patent: Jun. 17, 2025

(54) UNINTERRUPTIBLE POWER SUPPLY APPARATUS

(71) Applicant: TOSHIBA MITSUBISHI-ELECTRIC INDUSTRIAL SYSTEMS CORPORATION, Tokyo (JP)

(72) Inventor: Nobuyuki Momochi, Chuo-ku (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 18/577,551

(22) PCT Filed: May 31, 2022

(86) PCT No.: PCT/JP2022/022191
§ 371 (c)(1),
(2) Date: Jan. 8, 2024

(87) PCT Pub. No.: WO2023/233540
PCT Pub. Date: Dec. 7, 2023

(65) Prior Publication Data
US 2024/0339862 A1   Oct. 10, 2024

(51) Int. Cl.
*H02J 9/06* (2006.01)
*H02M 1/34* (2007.01)

(52) U.S. Cl.
CPC ............ *H02J 9/062* (2013.01); *H02M 1/348* (2021.05)

(58) Field of Classification Search
CPC ................ H02J 9/06–08; H02M 1/34–348
See application file for complete search history.

(56) References Cited

U.S. PATENT DOCUMENTS

| | | | |
|---|---|---|---|
| 6,226,191 B1 * | 5/2001 | Severinsky | H02M 1/34 363/58 |
| 2006/0202636 A1 * | 9/2006 | Schneider | H02J 9/062 315/291 |

(Continued)

FOREIGN PATENT DOCUMENTS

| | | | | |
|---|---|---|---|---|
| CN | 204967356 U | * | 1/2016 | |
| CN | 109995134 A | * | 7/2019 | ............... H02J 9/06 |

(Continued)

OTHER PUBLICATIONS

English machine translation of CN109995134A published Jul. 9, 2019. (Year: 2019).*

(Continued)

*Primary Examiner* — Rexford N Barnie
*Assistant Examiner* — David A Shiao
(74) *Attorney, Agent, or Firm* — Oblon, McClelland, Maier & Neustadt, L.L.P.

(57) ABSTRACT

An uninterruptible power supply apparatus includes a feed compensation circuit and a bypass circuit. The bypass circuit is provided in electrically parallel with the feed compensation circuit. The bypass circuit includes first to third switches and first to third circuits. The first to third switches are connected respectively to the first to third phases of a three-phase AC load. The first to third circuits are provided in electrically parallel with the first to third switches, respectively. The first circuit includes a first snubber circuit, a second snubber circuit, and a power line. The second circuit includes a first snubber circuit, a second snubber circuit, and a power line. The third circuit includes a first snubber circuit, a second snubber circuit, and a power line. Respective power lines of the first to third circuits are electrically connected to each other.

2 Claims, 8 Drawing Sheets (56) References Cited

U.S. PATENT DOCUMENTS

| | | | | |
|---|---|---|---|---|
| 2010/0042344 A1* | 2/2010 | Heber | ................... | G01R 31/40 |
| | | | | 702/58 |
| 2011/0278931 A1* | 11/2011 | Johnson, Jr. | ............ | H02J 3/381 |
| | | | | 307/66 |
| 2015/0380968 A1* | 12/2015 | Lee | .......................... | G06F 1/30 |
| | | | | 713/300 |
| 2017/0033596 A1* | 2/2017 | Brooks | ................ | H01H 50/641 |
| 2021/0242770 A1* | 8/2021 | Zhang | .................. | H03K 17/107 |
| 2023/0039409 A1* | 2/2023 | Zhang | .................... | H02J 9/062 |
| 2023/0307945 A1* | 9/2023 | Shen | ....................... | H02J 9/062 |

FOREIGN PATENT DOCUMENTS

| | | | |
|---|---|---|---|
| WO | WO 2020/021591 A1 | 1/2020 | |
| WO | WO-2020178969 A1 * | 9/2020 | ................ H02J 9/06 |

OTHER PUBLICATIONS

English machine translation of CN204967356U published Jan. 13, 2016 (Year: 2016).*

International Search Report issued Aug. 16, 2022 in PCT/JP2022/022191, filed on May 31, 2022, 2 pages.

* cited by examiner

UNINTERRUPTIBLE POWER SUPPLY APPARATUS

TECHNICAL FIELD

The present disclosure relates to an uninterruptible power supply apparatus.

BACKGROUND ART

WO2020/021591 discloses an uninterruptible power supply apparatus. The uninterruptible power supply apparatus includes an inverter circuit and a bypass circuit. These circuits are provided between a three-phase AC power supply and a three-phase AC load. The inverter circuit is configured to supply electric power to the three-phase AC load during power failure of the three-phase AC power supply. The bypass circuit is connected in electrically parallel with the inverter circuit, and includes a switch.

CITATION LIST

Patent Literature

PTL 1: WO2020/021591

SUMMARY OF INVENTION

Technical Problem

When the switch is turned on/off, surges may be generated. In order to reduce such surges, the bypass circuit preferably includes a snubber circuit. In this case, during power failure, a voltage may be applied from an output terminal of the inverter circuit (feed compensation circuit) to an input terminal of the bypass circuit through the snubber circuit. Such a voltage is called back-feed voltage and is preferably reduced. The present disclosure is made to solve the above problem, and an object of the present disclosure is to provide an uninterruptible power supply apparatus for reducing a back-feed voltage during power failure of a three-phase AC power supply.

Solution to Problem

An uninterruptible power supply apparatus of the present disclosure includes a feed compensation circuit and a bypass circuit. The feed compensation circuit is connected between a three-phase AC power supply and a three-phase AC load and supplies electric power to the three-phase AC load during power failure of the three-phase AC power supply. The bypass circuit is provided between the three-phase AC power supply and the three-phase AC load, and in electrically parallel with the feed compensation circuit. The bypass circuit includes first to third switches and first to third circuits. The first switch, the second switch, and the third switch are connected respectively to a first phase, a second phase, and a third phase of the three-phase AC load. The first circuit, the second circuit, and the third circuit are provided in electrically parallel with the first switch, the second switch, and the third switch, respectively. The first circuit, the second circuit, and the third circuit each include: a first snubber circuit; a second snubber circuit, and a power line. The second snubber circuit is provided between the first snubber circuit and the three-phase AC power supply. The power line is provided between the first snubber circuit and the second snubber circuit. The power lines, respectively, of the first circuit, the second circuit, and the third circuit are electrically connected to each other.

Advantageous Effects of Invention

According to the present disclosure, a back-feed voltage during power failure of a three-phase AC power supply can be reduced.

DESCRIPTION OF EMBODIMENTS

Embodiments are described hereinafter in detail with reference to the drawings. In the drawings, the same or corresponding parts are denoted by the same reference characters and a description thereof is not herein repeated.

Figure 1:
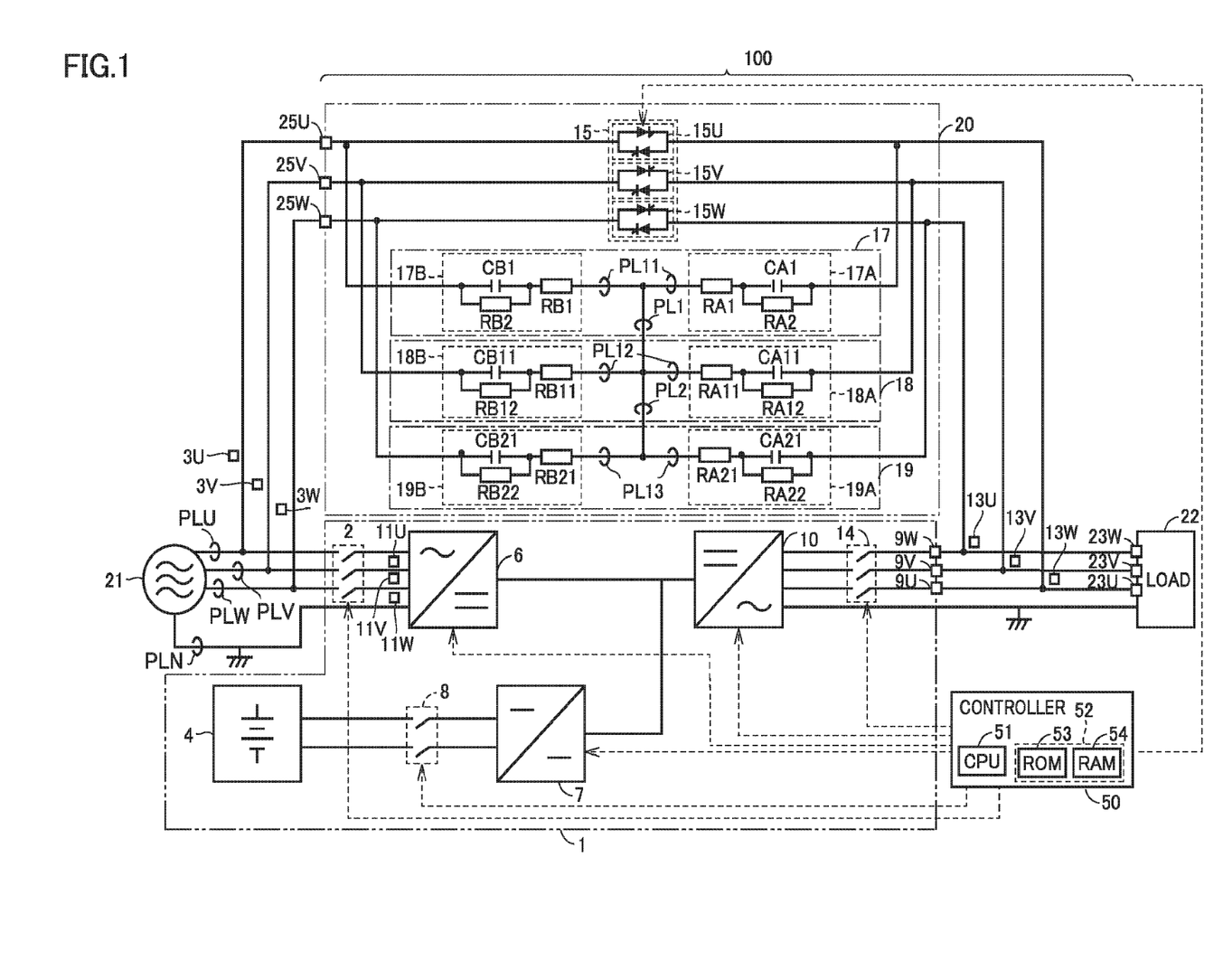
FIG. 1 shows a configuration of an uninterruptible power supply apparatus according to an embodiment.

FIG. 1 shows a configuration of an uninterruptible power supply apparatus 100 according to an embodiment. Referring to FIG. 1, uninterruptible power supply apparatus 100 is connected between a power supply 21 and a load 22.

Power supply 21 is a three-phase AC power supply, and connected to uninterruptible power supply apparatus 100 through power lines PLU, PLV and PLW and a neutral line PLN (three-phase four-wire system). Neutral line PLN is connected to the ground (earth) having a potential of 0.

Load 22 is a three-phase AC load that receives three-phase AC power to operate, and includes a U-phase input terminal 23U, a V-phase input terminal 23V, and a W-phase input terminal 23W. Load 22 is connected to uninterruptible power supply apparatus 100 through three power lines and one neutral line. The neutral line is connected to the ground.

Uninterruptible power supply apparatus 100 includes a feed compensation circuit (double conversion circuit) 1, voltage sensors 3U, 3V, and 3W, voltage sensors 13U, 13V, and 13W, a bypass circuit 20, and a controller 50.

Feed compensation circuit 1 is connected between power supply 21 and load 22, and supplies three-phase AC power to load 22 during power failure of power supply 21. Feed compensation circuit 1 includes relays 2, 8, and 14, a rectifier 6, a power storage device 4, a power converter 7, an inverter 10, and current sensors 11U, 11V, and 11W.

Relay 2 is provided between rectifier 6 and power supply 21, and connected to an input terminal of rectifier 6.

Rectifier 6 is connected to power supply 21 through relay 2, and configured to convert three-phase AC power supplied from power supply 21 into DC power, during a normal state of power supply 21. The normal state of power supply 21 means a state in which no power failure of power supply 21 occurs.

Power storage device 4 is a secondary battery configured to be rechargeable, and stores electric power to be supplied to load 22 during power failure.

Power converter 7 is a back-boost chopper circuit provided in an electrical path between a DC power line pair, which is located between rectifier 6 and inverter 10, and power storage device 4, and configured to be capable of performing bidirectional power conversion. During power failure of power supply 21, power converter 7 converts DC power of power storage device 4 into DC power of a voltage level different from the voltage level of power storage device 4, and supplies the converted DC power to inverter 10. During the normal state of power supply 21, power converter 7 may be configured to convert DC power from rectifier 6 into DC power of a voltage level different from the voltage level of rectifier 6, and supply the converted DC power to power storage device 4 through relay 8 to thereby charge power storage device 4. Relay 8 is provided between power storage device 4 and power converter 7.

Inverter 10 is connected to rectifier 6 and power converter 7. Inverter 10 converts DC power from rectifier 6 into three-phase AC power and supplies the three-phase AC power to load 22, during the normal state of power supply 21. Inverter 10 converts DC power from power converter 7 into three-phase AC power and supplies the three-phase AC power to load 22, during power failure of power supply 21.

Relay 14 is provided between inverter 10 and output terminals 9U, 9V, and 9W of feed compensation circuit 1. Output terminals 9U, 9V, and 9W are connected to the U phase (input terminal 23U), the V phase (input terminal 23V), and the W phase (input terminal 23W) of load 22, respectively.

Current sensors 11U, 11V, and 11W detect respective input currents to rectifier 6 from the U phase, the V phase, and the W phase of power supply 21, respectively.

Voltage sensors 3U, 3V, and 3W detect respective voltages of input terminals 25U, 25V, and 25W of bypass circuit 20, respectively. During the normal state of power supply 21, respective detection values of voltage sensors 3U, 3V, and 3W correspond to respective voltage values of the U phase (power line PLU), the V phase (power line PLV), and the W phase (power line PLW) of power supply 21, respectively.

Voltage sensors 13U, 13V, and 13W detect respective voltages of output terminal 9U, output terminal 9V, and output terminal 9W of uninterruptible power supply apparatus 150, respectively. Output terminals 9U, 9V, and 9W are connected to input terminal 23U, input terminal 23V, and input terminal 23W of load 22, respectively.

Bypass circuit 20 is provided between power supply 21 and load 22 and in electrically parallel with feed compensation circuit 1. When feed compensation circuit 1 fails, electric power is supplied from power supply 21 to load 22 through bypass circuit 20. Bypass circuit 20 includes switches 15U, 15V, and 15W, and circuit units 17, 18, and 19.

Switches 15U, 15V, and 15W are connected to the U phase (input terminal 23U), the V phase (input terminal 23V), and the W phase (input terminal 23W) of load 22, respectively. Switches 15U, 15V, and 15W are also connected to input terminals 25U, 25V, and 25W of bypass circuit 20, respectively. Each of switches 15U, 15V, and 15W is a semiconductor switch including a pair of thyristors. Switches 15U, 15V, and 15W are turned on when feed compensation circuit 1 fails, for example. The whole of switches 15U, 15V, and 15W is referred to as switch group 15.

Circuit units 17, 18, and 19 are provided in electrically parallel with switches 15U, 15V, and 15W, respectively. Circuit units 17, 18, and 19 are provided to reduce surges generated when switches 15U, 15V, and 15W are turned on/off, respectively.

Circuit unit 17 includes snubber circuits 17A and 17B and a power line PL11. Snubber circuit 17A includes a capacitor CA1 and resistors RA1 and RA2. Resistor RA1 is connected in series with capacitor CA1. Resistor RA2 is connected in electrically parallel with capacitor CA1.

Snubber circuit 17B is connected in series with snubber circuit 17A and provided between snubber circuit 17A and power supply 21. Snubber circuit 17B includes a capacitor CB1 and resistors RB1 and RB2. Resistor RB1 is connected in series with capacitor CB1. Resistor RB2 is connected in electrically parallel with capacitor CB1. Power line PL11 is provided between snubber circuit 17A and snubber circuit 17B.

Each of circuit units 18 and 19 has a configuration similar to that of circuit unit 17. Therefore, the detailed description is not herein repeated for circuit units 18 and 19.

Each of snubber circuits 17A, 18A, and 19A is an example of "first snubber circuit" of the present disclosure. Each of snubber circuits 17B, 18B, and 19B is an example of "second snubber circuit" of the present disclosure.

In the present embodiment, it is assumed that respective resistance values of resistors RA1, RA11, and RA21 are equal to each other in circuit units 17, 18, and 19. It is assumed that respective resistance values of RA2, RA12, and RA22 are also equal to each other. It is assumed that respective resistance values of resistors RB1, RB11, and RB21 are also equal to each other. It is assumed that respective resistance values of RB2, RB12, and RB22 are also equal to each other. It is assumed that respective capacitances of capacitors CA1, CA11, CA21 are also equal to each other. It is assumed that respective capacitances of capacitors CB1, CB11, and CB21 are also equal to each other. Resistors RA1, RB1, RA11, RB11, RA21, and RB21 are also referred to as "first resistor group." Resistors RA2, RB2, RA12, RB12, RA22, and RB22 are also referred to as "second resistor group."

Power line PL11 is connected to power line PL12 through power line PL1. Power line PL12 is connected to power line PL13 through power line PL2. Thus, power line PL11, power line PL12, and power line PL13 are electrically connected to each other.

Load 22 is a three-phase AC load, and therefore, the sum of respective potentials of the phases (the sum of respective voltages of input terminals 23U, 23V, and 23W) is substantially 0. Therefore, the sum of respective potentials of power lines PL11, PL12, and PL13 is substantially 0. In the above-described configuration, power lines PL11, PL12, and PL13 are connected to each other, and therefore, the potential of power line PL11, the potential of power line PL12, and the potential of power line PL13 are equal to each other. Thus, each of respective potentials of power lines PL11, PL12, and PL13 is substantially 0.

Controller 50 includes a CPU (Central Processing Unit) 51 and a memory 52. CPU 51 is an example of the processor, and executes various arithmetic operations. Memory 52 includes a ROM (Read Only Memory) 53 and a RAM (Random Access Memory) 54. ROM 53 stores a program to be executed by CPU 51. RAM 54 functions as a working memory.

Controller 50 is configured to control feed compensation circuit 1 (more specifically, relays 2, 8 and 14, rectifier 6, power converter 7, and inverter 10) and also configured to control switch group 15.

Figure 2:
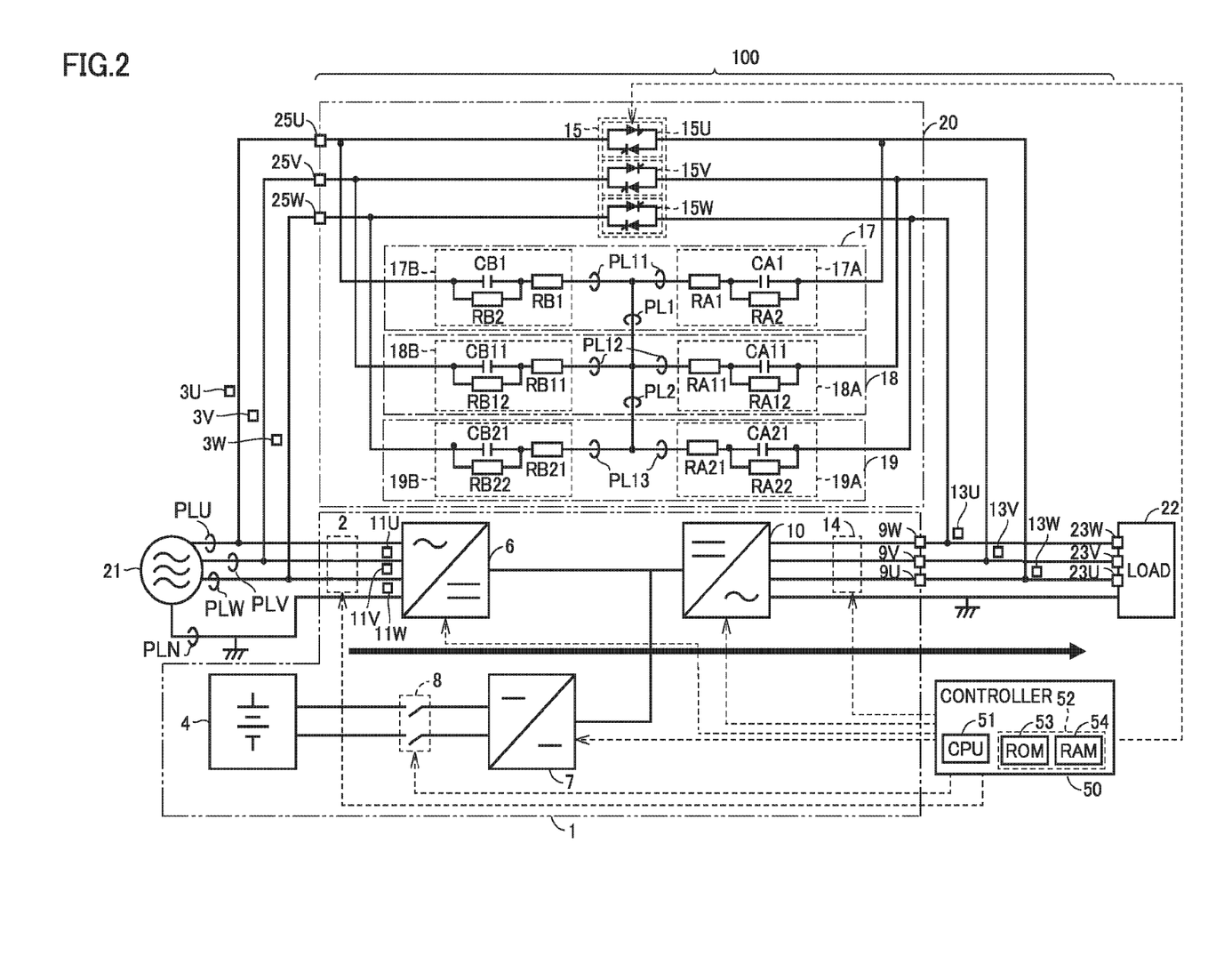
FIG. 2 illustrates a flow of electric power when a power supply is in a normal state.

FIG. 2 illustrates a flow of electric power when power supply 21 is in the normal state. Referring to FIG. 2, controller 50 controls switches 15U, 15V, and 15W to be in the off state and controls relays 2 and 14 to be in the closed state. Accordingly, AC power from power supply 21 is supplied to load 22 through rectifier 6 and inverter 10 (the bold arrow in FIG. 2). Power feeding from power supply 21 to load 22 when power supply 21 is in the normal state is also referred to as "normal power feeding."

Figure 3:
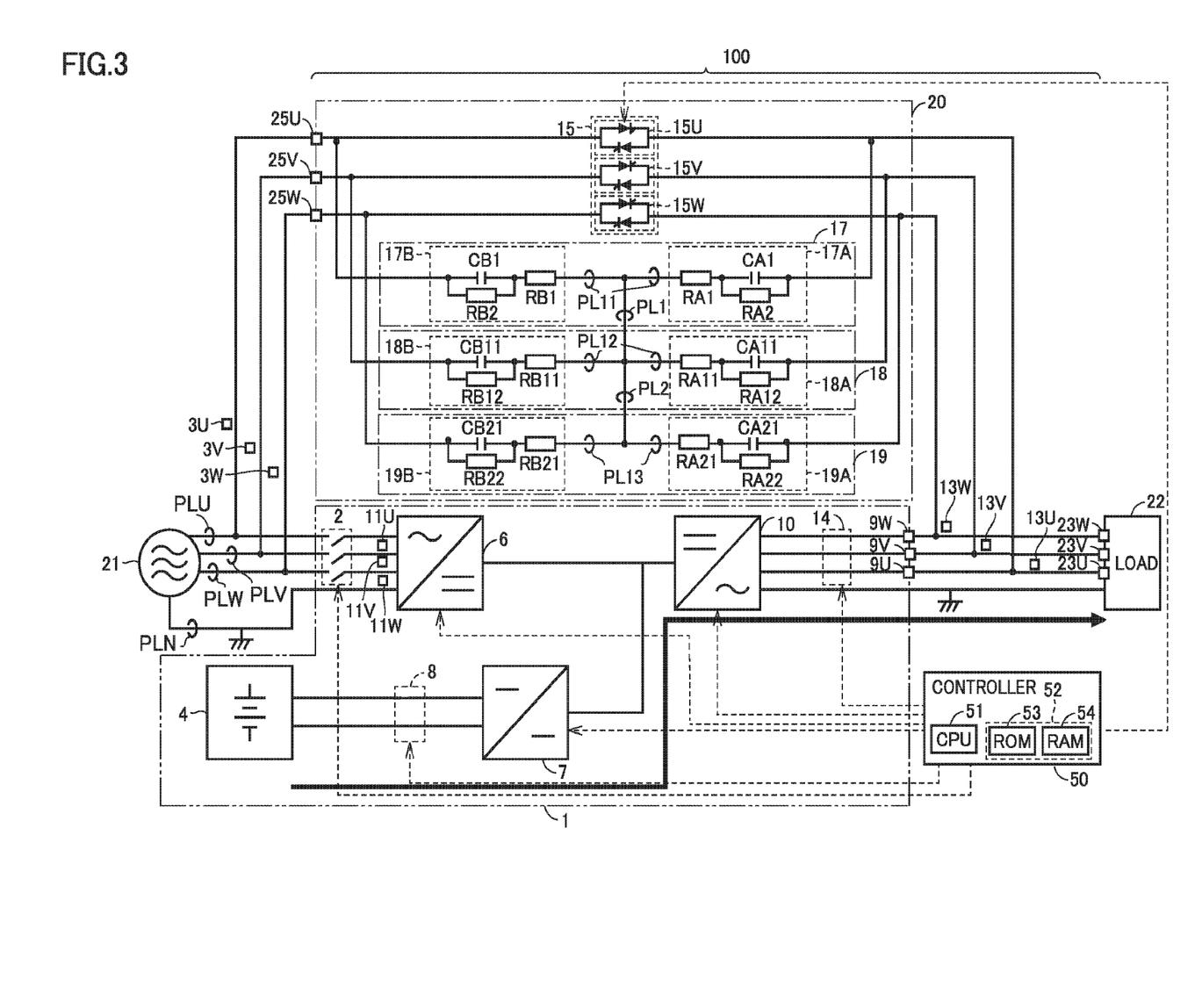
FIG. 3 illustrates a flow of electric power during power failure in this embodiment.

FIG. 3 illustrates a flow of electric power during power failure in this embodiment. Referring to FIG. 3, during power failure of power supply 21, controller 50 controls switches 15U, 15V, and 15W to be in the off state, controls relay 2 to be in the open state, and controls relays 8 and 14 to be in the closed state. In addition, controller 50 controls power converter 7 and inverter 10 so as to cause electric power of power storage device 4 to be supplied to load 22 through power converter 7 and inverter 10. As a result, electric power is fed from feed compensation circuit 1 to load 22 during power failure of power supply 21. This power feeding is also referred to as "compensating power feeding." The flow of electric power during execution of the compensating power feeding is represented by the bold arrow in FIG. 3.

Before a description is herein given of advantages of uninterruptible power supply apparatus 100, configurations of the uninterruptible power supply apparatus in Comparative Examples 1 and 2 are described in the following. First, Comparative Example 1 is described.

Figure 4:
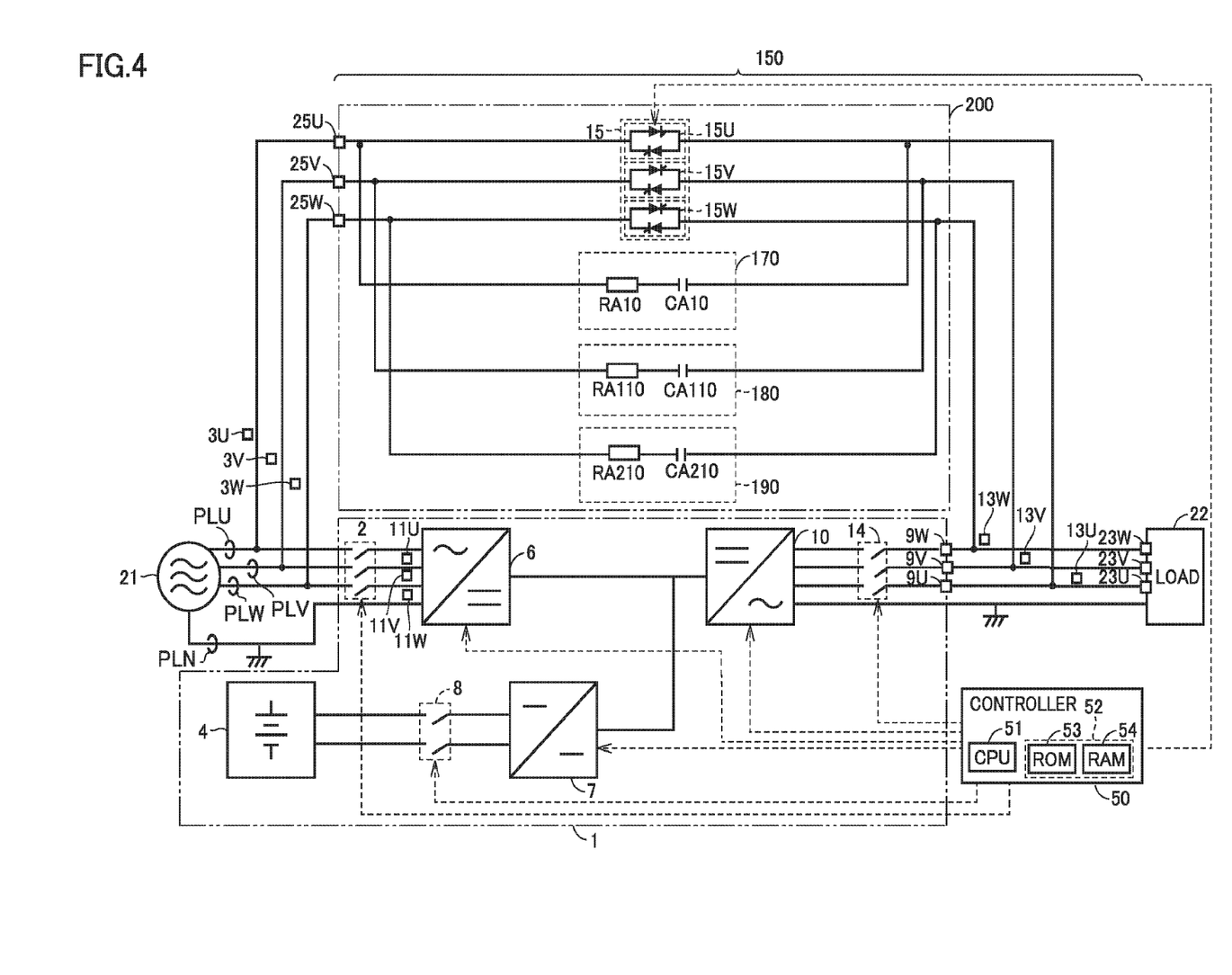
FIG. 4 shows a configuration of an uninterruptible power supply apparatus according to Comparative Example 1.

FIG. 4 shows a configuration of an uninterruptible power supply apparatus according to Comparative Example 1. In the following description, reference is made to FIG. 1 as appropriate.

Referring to FIG. 4, uninterruptible power supply apparatus 150 of this comparative example differs from uninterruptible power supply apparatus 100 in that the former includes a bypass circuit 200 instead of bypass circuit 20. In other respects, the configuration of uninterruptible power supply apparatus 150 is basically the same as the configuration of uninterruptible power supply apparatus 100.

Bypass circuit 200 differs from bypass circuit 20 in that the former includes snubber circuits 170, 180, and 190 instead of circuit units 17, 18, and 19.

Snubber circuit 170 includes a capacitor CA10 and a resistor RA10. Snubber circuit 180 includes a capacitor CA110 and a resistor RA110. Snubber circuit 190 includes a capacitor CA210 and a resistor RA210.

In this comparative example, unlike the present embodiment (FIGS. 1 to 3), a single snubber circuit is provided in parallel with each switch, and two snubber circuits connected in series to each other are not provided in parallel with each switch. Therefore, bypass circuit 200 does not include power lines corresponding to power lines PL11, PL12, and PL13.

Figure 5:
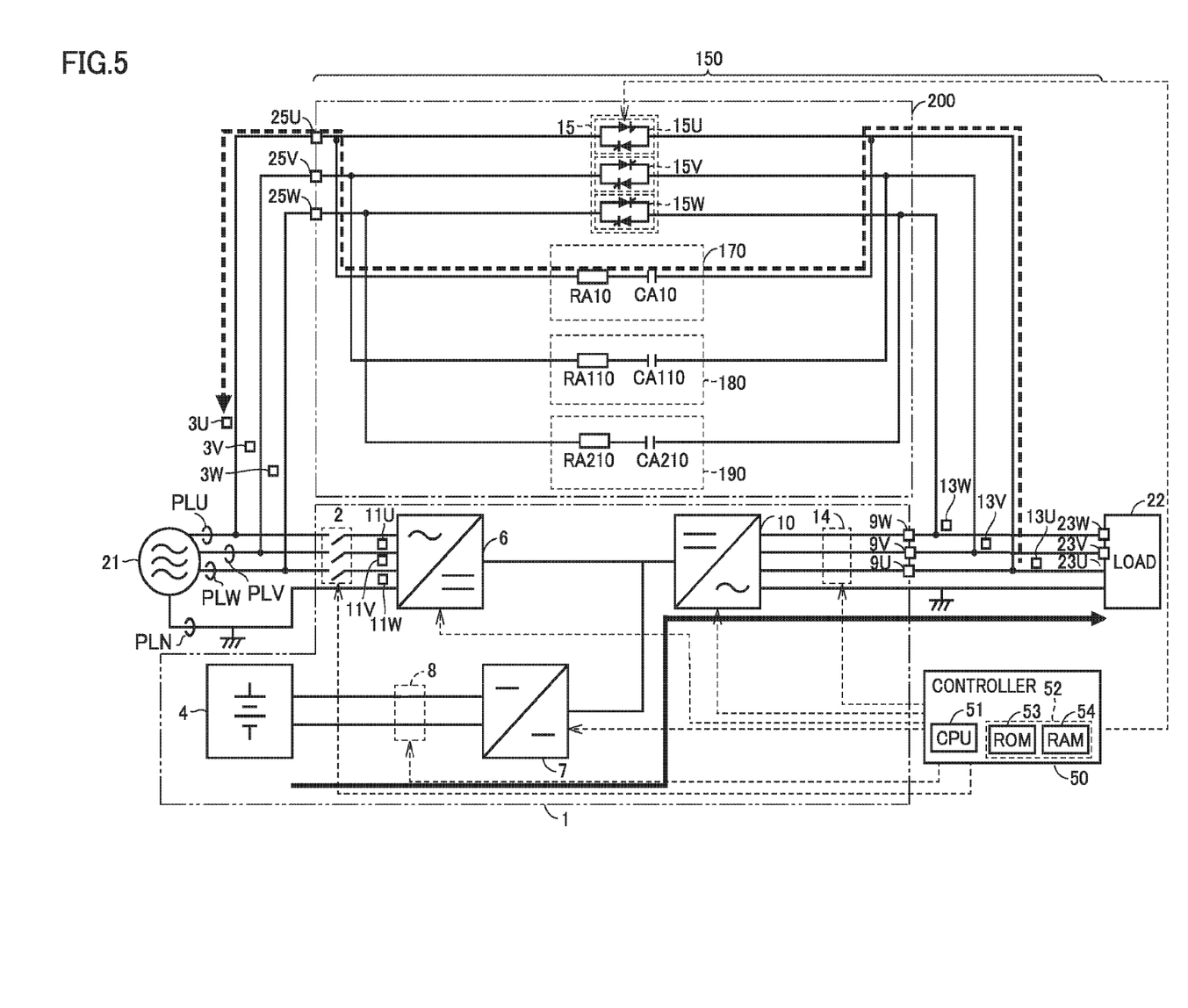
FIG. 5 shows a state in which a back-feed voltage is generated in Comparative Example 1.

FIG. 5 shows a state in which a back-feed voltage is generated in Comparative Example 1. Referring to FIG. 5, when power failure of power supply 21 occurs, controller 50 controls feed compensation circuit 1 so as to start the compensating power feeding. As a result, a back-feed voltage is applied from an output terminal (e.g., output terminal 9U) of feed compensation circuit 1 to an input terminal (e.g., input terminal 25U) of bypass circuit 200 through a snubber circuit (e.g., snubber circuit 170) (the bold broken line in FIG. 5).

The back-feed voltage corresponds to a potential difference between each input terminal of the bypass circuit and the ground during power failure. Preferably, the back-feed voltage is prevented from being generated, or reduced as early as possible even when the back-feed voltage is generated. The back-feed voltage may also be applied to input terminals 25V, 25W depending on the voltages of output terminals 9W, 9V, 9U.

Figure 6:
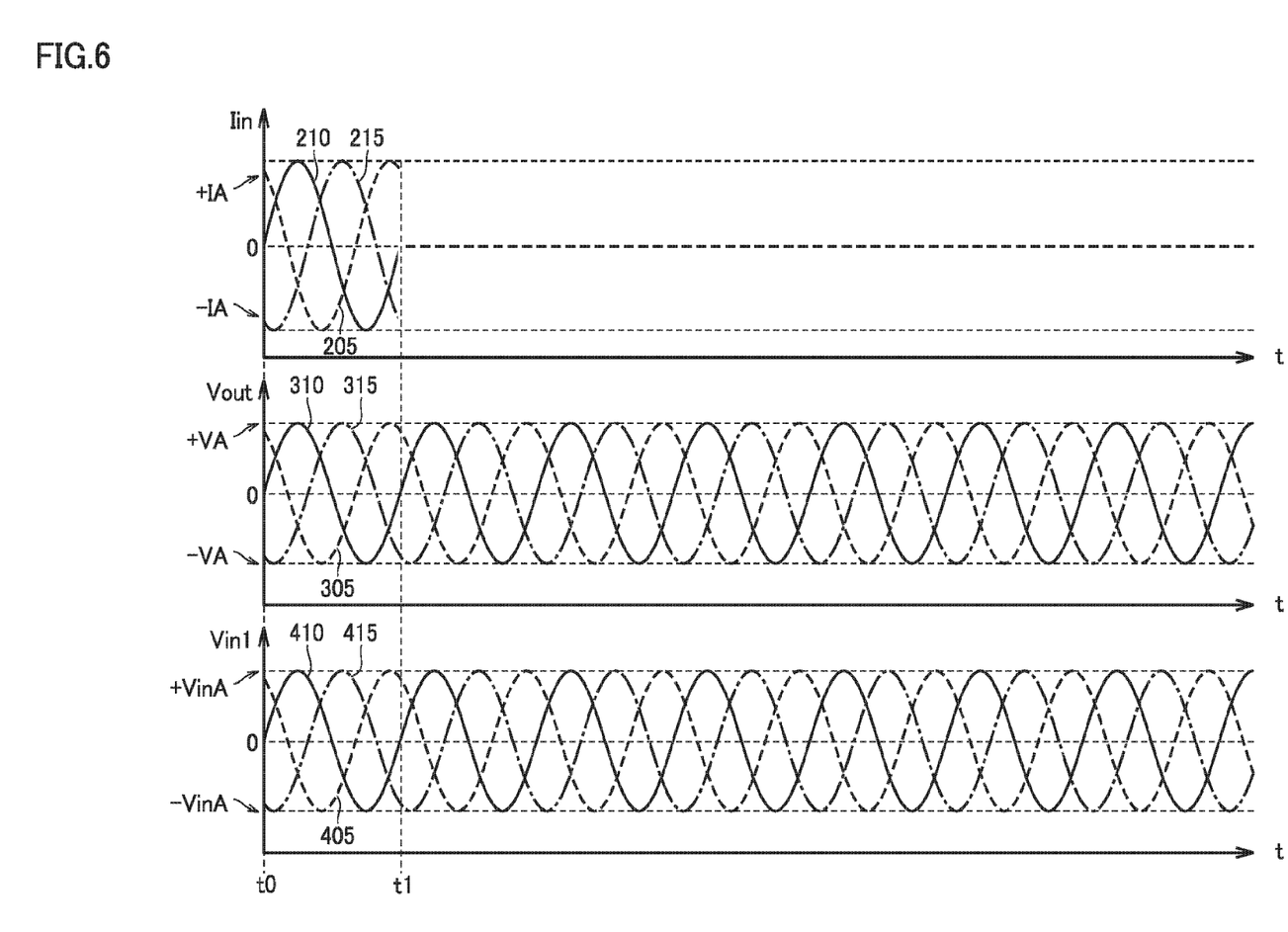
FIG. 6 is a timing chart for illustrating transition of respective voltages of input terminals of a bypass circuit according to Comparative Example 1.

FIG. 6 is a timing chart for illustrating transition of respective voltages of input terminals 25U, 25V, and 25W of bypass circuit 200 in Comparative Example 1. In the following description, reference is made to FIG. 5 as appropriate.

Referring to FIG. 6, the horizontal axis represents time. At time t0, it is assumed that power supply 21 is in the normal state and the normal power feeding is being executed. The vertical axis represents, in order from the top, input current Iin from power supply 21 to rectifier 6, output voltage Vout of uninterruptible power supply apparatus 150, and voltage Vin1 of input terminal 25U, 25V, or 25W of bypass circuit 200. Voltage Vin1 is a potential difference between a corresponding input terminal and the ground.

Lines 205, 210, and 215 represent transition of respective currents (input currents Iin) supplied from the U phase, the V phase, and the W phase of power supply 21 to rectifier 6, respectively. Lines 205, 210, and 215 are based on respective detection values of current sensors 11U, 11V, and 11W, respectively. The amplitude of input current Iin is IA.

Lines 305, 310, and 315 represent transition of respective voltages (output voltages Vout) of output terminals 9U, 9V, and 9W of uninterruptible power supply apparatus 150, respectively. Lines 305, 310, and 315 are based on respective detection values of voltage sensors 13U, 13V, and 13W, respectively. The amplitude of output voltage Vout is VA.

Lines 405, 410, and 415 represent transition of respective voltages Vin1 of input terminals 25U, 25V, and 25W of bypass circuit 200, respectively. Lines 405, 410, and 415 are based on respective detection values of voltage sensors 3U, 3V, and 3W, respectively. The amplitude of voltage Vin1 is VinA.

When power failure of power supply 21 occurs at time t1, controller 50 opens relay 2. Accordingly, input current Iin from each phase of power supply 21 is blocked (lines 205, 210, 215). In addition, controller 50 controls feed compensation circuit 1, so that the compensating power feeding is performed instead of the normal power feeding. Accordingly, after time t1, output voltages Vout similar to those before time t1 are supplied from output terminals 9U, 9V, and 9W of uninterruptible power supply apparatus 150 respectively to input terminals 23U, 23V, and 23W of load 22 (lines 305, 310, and 315).

As a result, respective back-feed voltages are applied from output terminals 9U, 9V, and 9W of uninterruptible power supply apparatus 150 to input terminals 25U, 25V, and 25W of bypass circuit 20 through snubber circuits 170, 180, and 190, respectively (lines 405, 410, and 415). Therefore, in Comparative Example 1, there is a possibility that the back-feed voltage is generated as long as the compensating power feeding is executed after time t1.

No power failure occurs before time t1, and therefore, respective voltages of input terminals 25U, 25V, and 25W are equal to respective voltages of the U phase, the V phase, and the W phase of power supply 21, respectively. Therefore, no back-feed voltage is generated.

Next, Comparative Example 2 is described. In Comparative Example 2, the uninterruptible power supply apparatus has a configuration for preventing generation of a back-feed voltage after power failure.

Figure 7:
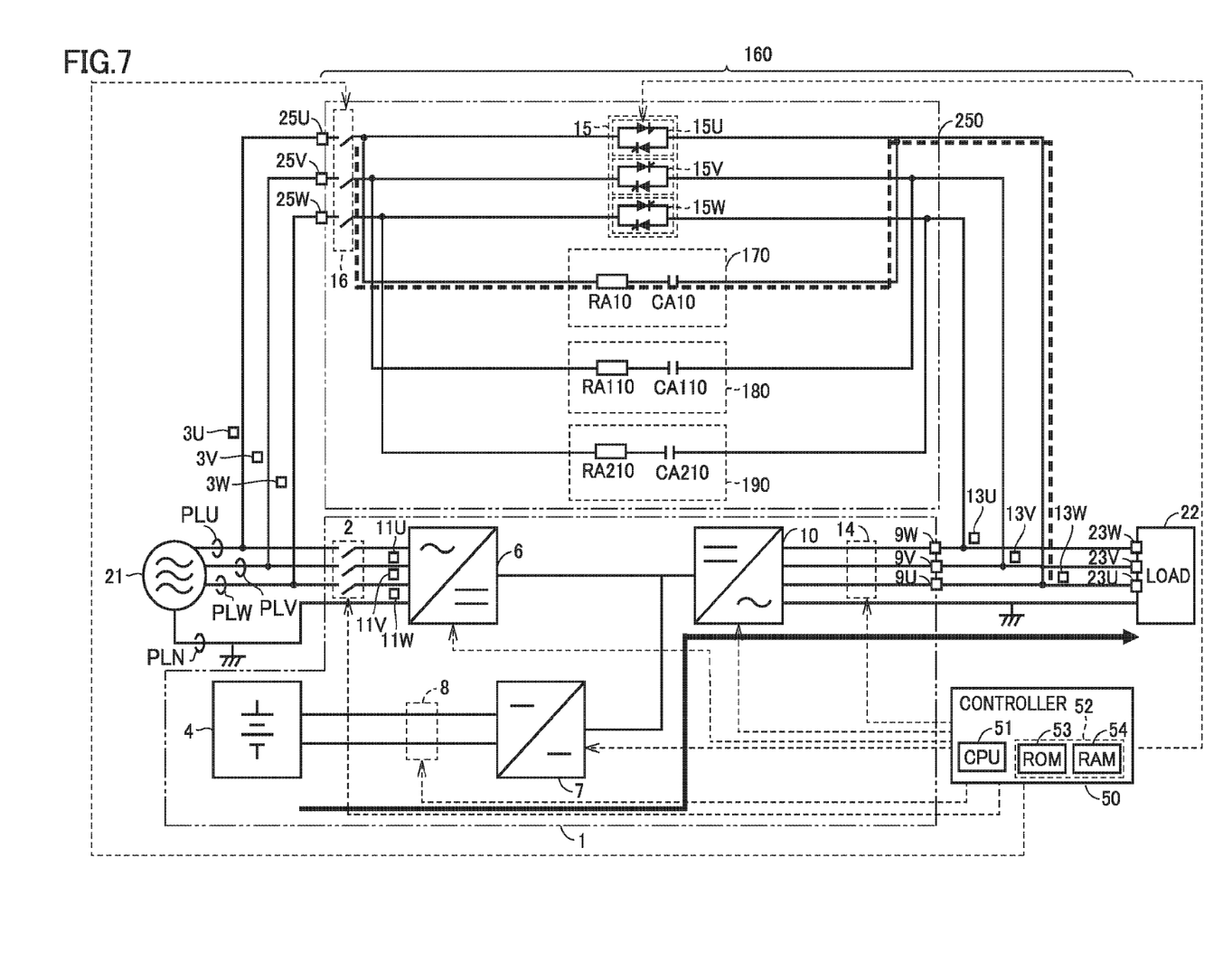
FIG. 7 shows a configuration of an uninterruptible power supply apparatus according to Comparative Example 2.

FIG. 7 shows a configuration of an uninterruptible power supply apparatus according to Comparative Example 2. In the following description, reference is made to FIG. 4 as appropriate.

Referring to FIG. 7, uninterruptible power supply apparatus 160 of this comparative example differs from uninterruptible power supply apparatus 150 (FIGS. 4 and 5) of Comparative Example 1 in that the former includes a bypass circuit 250 instead of bypass circuit 200. In other respects, the configuration of uninterruptible power supply apparatus 160 is basically the same as the configuration of uninterruptible power supply apparatus 150.

Bypass circuit 250 differs from bypass circuit 200 of Comparative Example 1 in that a switch 16 is incorporated in the bypass circuit. ON/OFF of switch 16 is controlled by controller 50.

In this comparative example, controller 50 turns off switch 16 when the compensating power feeding is started in response to power failure. Accordingly, application of the back-feed voltages to input terminals 25U, 25V, and 25W is prevented. Switch 16 is kept in the OFF state as long as the compensating power feeding continues.

Thus, in Comparative Example 2, switch 16 can be turned off when power failure occurs, to thereby prevent generation of the back-feed voltage. However, the uninterruptible power supply apparatus is required to incorporate switch 16 in order to prevent generation of the back-feed voltage. Even when the uninterruptible power supply apparatus does not incorporate switch 16, it is preferable to reduce the back-feed voltage.

Unlike uninterruptible power supply apparatus 150 of Comparative Example 1, uninterruptible power supply apparatus 100 (FIGS. 1 to 3) according to the present embodiment has an advantage that it can reduce the back-feed voltage. Further, unlike uninterruptible power supply apparatus 160 of Comparative Example 2, uninterruptible power supply apparatus 100 has an advantage that it does not necessarily require switch 16 incorporated to reduce the back-feed voltage. The reason why the back-feed voltage is reduced is described in the following.

Figure 8:
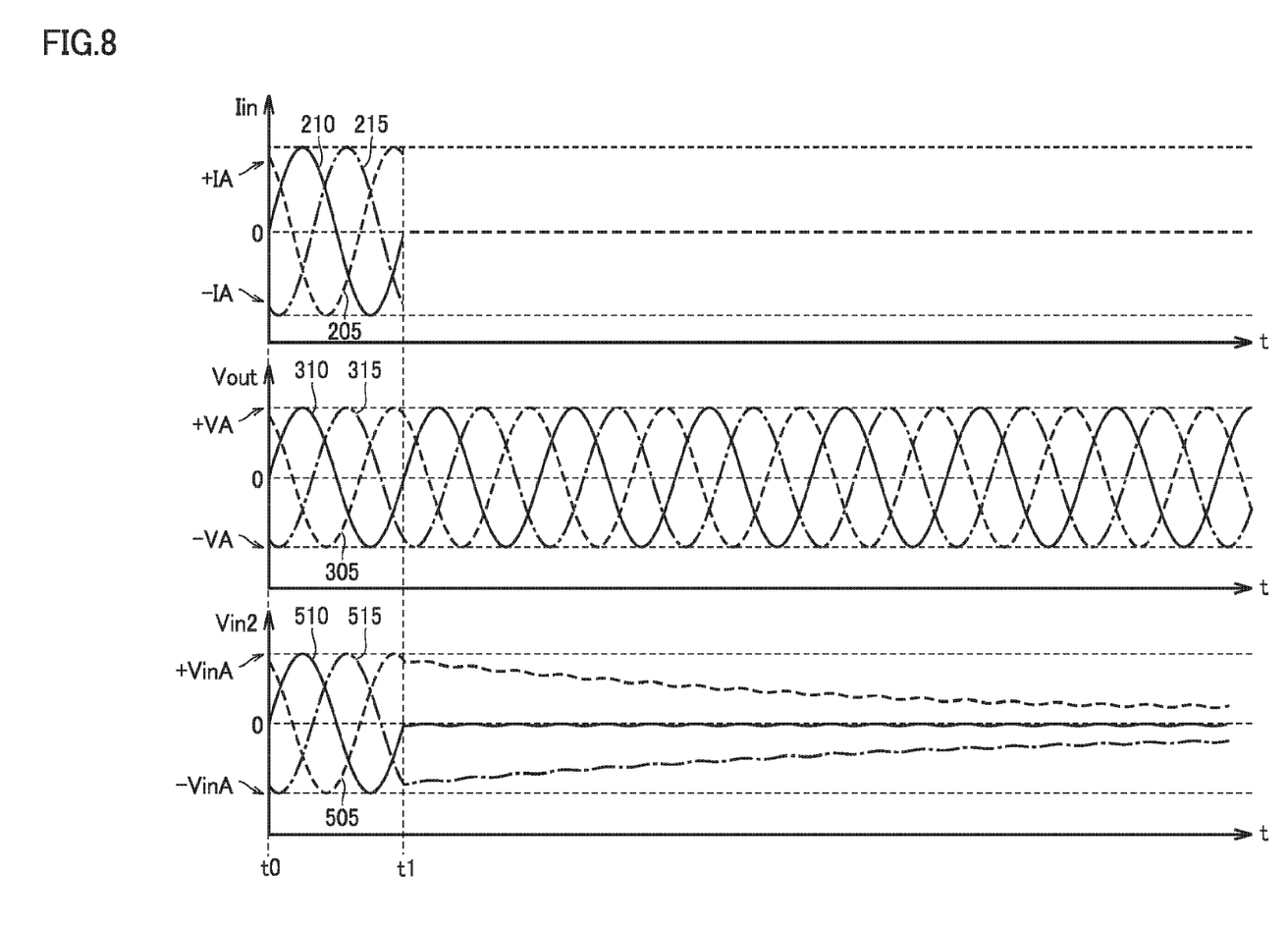
FIG. 8 is a timing chart for illustrating transition of respective voltages of input terminals of a bypass circuit according to the present embodiment.

FIG. 8 is a timing chart for illustrating transition of respective voltages of input terminals 25U, 25V, and 25W of bypass circuit 20 according to the present embodiment. In the following description, reference is made to FIG. 3 as appropriate.

Referring to FIG. 8, the horizontal axis represents time. Time t0 and time t1 are the same as those shown in FIG. 6. The vertical axis represents, in order from the top, input current Iin from power supply 21 to rectifier 6, output voltage Vout of uninterruptible power supply apparatus 100, and voltage Vin2 of input terminal 25U, 25V, or 25W of bypass circuit 20.

Lines 205 to 215 and lines 305 to 315 are respectively the same as those shown in FIG. 6.

Lines 505, 510, and 515 represent transition of respective voltages Vin2 applied to input terminals 25U, 25V, and 25W of bypass circuit 20, respectively. Voltage Vin2 is a potential difference between a corresponding input terminal and the ground.

When power failure of power supply 21 occurs at time t1, current stops flowing between snubber circuits 17B, 18B, and 19B and power supply 21. Accordingly, respective voltages across snubber circuits 17B, 18B, and 19B approach 0 with time, and finally reach 0.

As a result, respective potentials of input terminals 25U, 25V, and 25W approach respective potentials of power lines PL11, PL12, and PL13 with time, respectively. As described above, the potential of each power line is substantially 0, and therefore, the potential of each input terminal finally reaches substantially 0. As a result, voltage Vin2 of each input terminal approaches 0 with time, and finally reaches 0 (lines 505, 510, and 515). Therefore, in the present embodiment, the back-feed voltage during power failure can be reduced as compared with Comparative Example 1 (lines 405, 410, and 415 in FIG. 6).

As described above, uninterruptible power supply apparatus 100 includes resistors RA2, RB2, RA12, RB12, RA22, and RB22 (second resistor group). While uninterruptible power supply apparatus 100 is not necessarily required to include the resistors of the second resistor group, in terms of finally reducing the back-feed voltage to voltage 0, preferably uninterruptible power supply apparatus 100 includes these resistors, in terms of reducing the back-feed voltage to voltage 0 in an earlier stage. Specifically, charges stored in capacitors CB1, CB11, and CB21 at time t1 are consumed by the resistors of the second resistor group in addition to the resistors of the first resistor group (resistors RA1, RB1, RA11, RB11, RA21, and RB21), after power failure. Thus, the charges of these capacitors are more easily discharged, relative to the case where uninterruptible power supply apparatus 100 does not include the resistors of the second resistor group. As a result, the time required for discharging these capacitors is shortened.

Thus, the voltages of these capacitors reach 0 in an earlier stage, and therefore, respective voltages across snubber circuits 17B, 18B, and 19B also reach 0 in an earlier stage. As a result, respective potentials of the input terminals 25U, 25V, and 25W also reach 0 in an earlier stage. Accordingly, voltage Vin2 of each input terminal (potential difference between the input terminal and the ground) reaches 0 in an earlier stage, and therefore, the back-feed voltage can be reduced in an earlier stage.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 feed compensation circuit; 2, 8, 14 relay; 4 power storage device; 6 rectifier; 7 power converter; 10 inverter; 15U, 15V, 15W, 16 switch; 17, 18, 19 circuit unit; 17A, 17B, 18A, 18B, 19A, 19B, 170, 180, 190 snubber circuit; 20, 200, 250 bypass circuit; 21 power supply; 22 load; 100, 150, 160 uninterruptible power supply apparatus; PL1, PL2, PL11, PL12, PL13, PLU, PLV, PLW power line

The invention claimed is:

1. An uninterruptible power supply apparatus comprising:
a feed compensation circuit that is connected between a three-phase AC power supply and a three-phase AC load and supplies electric power to the three-phase AC load during power failure of the three-phase AC power supply; and
a bypass circuit that is provided between the three-phase AC power supply and the three-phase AC load, and in electrically parallel with the feed compensation circuit, wherein the bypass circuit includes:
- a first switch, a second switch, and a third switch that are connected respectively to a first phase, a second phase, and a third phase of the three-phase AC load; and
- a first circuit, a second circuit, and a third circuit provided in electrically parallel with the first switch, the second switch, and the third switch, respectively, the first circuit, the second circuit, and the third circuit each include:
- a first snubber circuit;
- a second snubber circuit provided between the first snubber circuit and the three-phase AC power supply; and
- a power line between the first snubber circuit and the second snubber circuit, and the power lines of the first circuit, the second circuit, and the third circuit are electrically connected to each other.

2. The uninterruptible power supply apparatus according to claim 1, wherein
the first snubber circuit and the second snubber circuit each include:
- a capacitor; and
- an electrical resistor connected in electrically parallel with the capacitor.

\* \* \* \* \*